(12) United States Patent
Pennanen et al.

(10) Patent No.: US 9,119,032 B2
(45) Date of Patent: Aug. 25, 2015

(54) USER ACTIVITY TRACKING SYSTEM AND DEVICE

(71) Applicant: Facebook Inc., Menlo Park, CA (US)

(72) Inventors: Juho Pennanen, Helsinki (FI); Aapo Kyrölä, Pittsburgh, PA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/616,533

(22) Filed: Feb. 6, 2015

(65) Prior Publication Data

US 2015/0156623 A1    Jun. 4, 2015

Related U.S. Application Data

(63) Continuation of application No. 13/930,347, filed on Jun. 28, 2013.

(51) Int. Cl.
*H04W 24/00* (2009.01)
*H04W 8/02* (2009.01)
*H04W 4/02* (2009.01)
*H04W 64/00* (2009.01)

(52) U.S. Cl.
CPC *H04W 8/02* (2013.01); *H04W 4/02* (2013.01); *H04W 64/00* (2013.01)

(58) Field of Classification Search
CPC .................................................. H04W 4/005
See application file for complete search history.

(56) References Cited

U.S. PATENT DOCUMENTS

| | | | |
|---|---|---|---|
| 8,948,783 B2 * | 2/2015 | Pennanen et al. | 455/456.1 |
| 2010/0070456 A1 * | 3/2010 | Sugihara et al. | 706/54 |
| 2012/0083714 A1 * | 4/2012 | Yuen et al. | 600/587 |
| 2012/0306745 A1 * | 12/2012 | Moore et al. | 345/158 |
| 2015/0004998 A1 * | 1/2015 | Pennanen et al. | 455/456.1 |
| 2015/0005030 A1 * | 1/2015 | Pennanen et al. | 455/556.1 |

* cited by examiner

*Primary Examiner* — Ronald Eisner
(74) *Attorney, Agent, or Firm* — Baker Botts L.L.P.

(57) ABSTRACT

In one embodiment, a computing device receives from a mobile device sensor signals which indicate motion associated with activities of a user of the mobile device. The computing device determines a number of activity types that correspond to at least a portion of the received sensor signals. The computing device determines a number of activity periods of the user, each activity period corresponding to a likely activity type, by analyzing the sensor signals against each of the activity types, and calculating a probability of each of the activity types. The computing device determines whether two or more of the determined activity periods should be combined into a single period, based on a heuristics-type analysis based on a length of time for each of the two or more activity periods. The activity periods are sent to the mobile device.

20 Claims, 5 Drawing Sheets

USER ACTIVITY TRACKING SYSTEM AND DEVICE

PRIORITY

This application is a continuation of U.S. patent application Ser. No. 13/930,347, filed 28 Jun. 2013, the disclosure of which is incorporated herein by reference in its entirety.

FIELD

The present disclosure generally relates to tracking, recording and analyzing user activities, and more specifically to systems, and associated methods, for tracking, recording and analyzing movements of at least one mobile communication device of a user. Moreover, aspects of the disclosure are also directed to software products recorded on machine-readable data storage media, wherein such software products are executable upon computing hardware, to implement the aforesaid methods of the disclosure.

BACKGROUND

Tracking devices exist that sense and track user activities, especially sports activities. An example of a known activity tracking device is a wearable wristwatch device which includes a GPS receiver for tracking and analyzing 'running' activity of the user. Another example is a mobile application that utilizes a GPS system of a respective mobile phone for recording movement of users while they exercise. Another example is step counters used in shoes or attached to user clothes to collect numbers of steps taken by the users. However, none of the known tracking devices automatically sense, record, analyze and identify all types of user activities such as walking, running, jogging, cycling, rowing, driving with car, moving with bus, moving with train, walking stairs, running stairs, jumping, swimming, playing football, and skiing.

Nowadays, smart phones are equipped with increasing numbers of sensors such as Global Positioning System (GPS) receivers, accelerometers, and proximity sensors, and users of these smart phones may find it interesting to have mobile applications that can automatically record, sense, analyze, and identify their activities. However, a key challenge in automatic tracking of users' movements for purpose of analyzing types of activity is the classification of activity types. For example, walking vs running activity may have only small difference in respect of collected sensor data. Moreover, for the same activity, the sensor data may vary depending on how the smart phone is carried by the user. For example, the smart phone may be carried by the user in hand, or in pocket or in backpack manners.

Hence, there exists a need for an activity tracking solution, that accurately senses and analyzes all kinds of user activities, and that addresses limitations of known activity tracking solutions.

SUMMARY

The present disclosure seeks to provide a system for tracking and recording movements of a mobile communication device and a method of the using the same.

In one aspect, embodiments of the present disclosure provide a system for tracking and recording movements of a mobile communication device, that includes one or more movement sensors and a wireless interface. The system includes a communication network for communicating with the mobile communication device and computing hardware for processing data supplied in operation from the mobile communication device. The mobile communication device communicates sensor signals, for example in a form of sensor data, to the system, wherein the sensor signals are indicative of motion associated with activities to which the mobile communication device is exposed by its user.

The computing hardware executes software products for analysing the sensor signals to pre-classify the sensor signals to generate intermediate data. The intermediate data is thereafter processed in one or more processors to generate indications of likely activities associated with the sensor signals. The computing hardware further computes an aggregate of the indications to provide an analysis of one or more activities associated with the sensor signals, and then sends information indicating most likely activity types to the mobile communication device.

The processors are configured to process the sensor signals substantially in parallel, wherein the processors are mutually specialized in identifying characteristics of the signals corresponding to activities to which the processors are dedicated.

The system generates a temporal log of activities experienced by the mobile communication device, and presents the activities on a graphical user interface of a user in a timeline format.

The mobile communication device is implemented by way of at least one of: a portable computer such as laptop, a smartphone, a wrist-worn phone, a phablet, a mobile telephone, a tablet computer, a portable media device or any other computing device that can be worn by the user and is capable of processing and displaying data. Further, one or more sensors of the mobile communication device are implemented using at least one of: a gyroscopic angular sensor, an accelerometer, a GPS position sensor, cellular positioning sensor, a magnetometer, a microphone, a camera, a temperature sensor. Term cellular positioning sensor can refer to determining the location and movement of the mobile communication device can be derived/analyzed/measured using information related to a cellular network and information related to radio base stations and their signals.

When executed on the computing hardware, the software products are operable to implement supervised or semisupervised classification analysis such as neural networks, decision forest, and support vector machines of information included in the sensor signals. As input, the supervised or semisupervised classification algorithms can use, for instance, the amplitudes of the frequency components of the information included in the one or more sensor signals, and the output of the classification algorithms are estimated probabilities of different activities, conditional on the sensor signals.

In another aspect, the mobile communication device includes a data processor for executing a mobile software application thereat, wherein the mobile software application is operable when executed to cause a graphical user interface of the mobile communication device to present analyzed activity results provided from the computing hardware in a form of a timeline, wherein different analyzed activities are represented by mutually different symbols in respect of the timeline.

In yet another aspect, embodiments of the present disclosure provide a method of using the system for tracking and recording movements of the mobile communication device.

In yet another aspect, embodiments of the present disclosure provide a mobile communication device for implementing the system for tracking and recording movements of the user.

In yet another aspect, embodiments of the present disclosure provide a software product recorded on a non-transitory machine-readable data storage media, such that the software product is executable upon computing hardware for implementing the method of using the system for tracking and recording movements of the mobile communication device. The software product is downloadable from a software application store to the mobile communication device.

Embodiments of the present disclosure accurately sense, analyze and identify of user activities by analyzing data collected from one or more sensors of a mobile communication device of a user. The sensor data is processed by a set of independent instances of classification algorithms and each instance is optionally dedicated to identify a specific type of activity. The output of the set of classification algorithm instances is aggregated and analyzed to generate most likely user activities associated with the mobile communication device. The identified activities are then displayed on a graphical user interface of the mobile communication device in a timeline format.

Alternatively embodiments of the present disclosure accurately sense, analyze and identify of user activities by analyzing data collected from one or more sensors of a mobile communication device of a user. The sensor data is processed by a set of parallel processors, wherein the parallel processors are parallel instances of classification algorithms and each processor is optionally dedicated to identify a specific type of activity. The output of the set of parallel processors is aggregated and analyzed to generate most likely user activities associated with the mobile communication device. The identified activities are then displayed on a graphical user interface of the mobile communication device in a timeline format. In current disclosure parallel processors can refer to implementation architecture where part of the software is executed in different central processing units (i.e. microprocessors) and/or parallel instances of classification algorithms i.e. in parallel software processes. Parallel can refers to calculation processes executed substantially at the same time but is not limited to. Executing of instances can take place also one by one or as combination of some processes executed substantially same time and some one by one.

Additional aspects, advantages, features and objects of the present disclosure would be made apparent from the drawings and the detailed description of the illustrative embodiments construed in conjunction with the appended claims that follow.

It will be appreciated that features of the invention are susceptible to being combined in various combinations without departing from the scope of the invention as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the invention is not limited to specific methods and instrumentalities disclosed herein. Moreover, those in the art will understand that the drawings are not to scale. Wherever possible, like elements have been indicated by identical numbers.

DETAILED DESCRIPTION OF ILLUSTRATIVE EMBODIMENTS

The following detailed description illustrates embodiments of the disclosure and ways in which it can be implemented. Although the best mode of carrying out the invention has been disclosed, those in the art would recognize that other embodiments for carrying out or practicing the invention are also possible.

The present disclosure provides a system for tracking and recording movements of the mobile communication device, wherein the system includes one or more movement sensors and a wireless interface. The system includes a communication network for communicating with the mobile communication device and computing hardware for processing data supplied in operation from the mobile communication device. The mobile communication device communicates one or more sensor signals, for example in a digitized format as corresponding sensor data, to the system, wherein the sensor signals are indicative of motion associated with activities to which the mobile communication device is exposed by its user.

The computing hardware executes one or more software products for analyzing the sensor signals to pre-classify the sensor signals to generate intermediate data, and the intermediate data is thereafter processed in one or more processors to generate one or more indications of likely activities associated with the sensor signals. The computing hardware further computes an aggregate of the indications to provide an analysis of one or more activities associated with the sensor signals, and sends information indicating most likely activity types to the mobile communication device.

Figure 1:
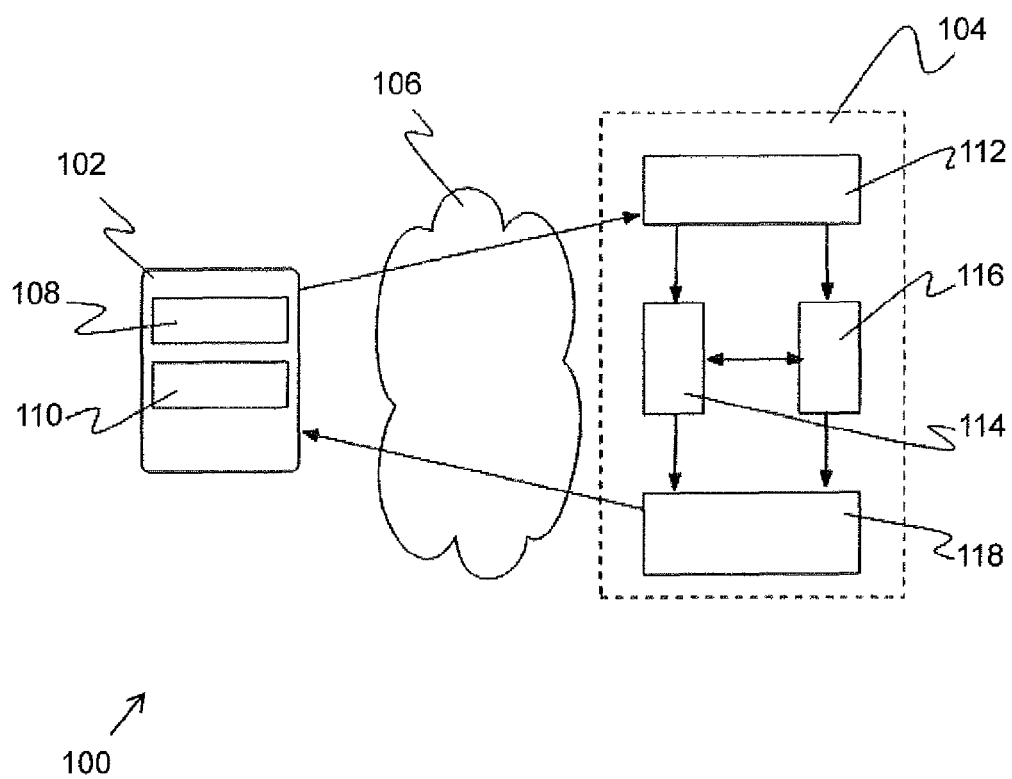
FIG. 1 is an illustration of a high-level architecture of a system that is suitable for practicing various implementations of the present disclosure.

Referring now to the drawings, particularly by their reference numbers, FIG. 1 is an illustration of a high-level architecture of a system 100 that is suitable for practicing various implementations of the present disclosure.

The system 100 includes a mobile communication device 102, and a server system 104 coupled in communication to the mobile communication device 102 by way of a communication network 106. The mobile communication device 102 is a handheld device of a user, and examples of the mobile communication device 102, include, but are not limited to, smart phone, wrist-worn phone, phablet, mobile telephone, tablet computer executing operating systems such as Android, Windows, and iOS. The server system 104 includes a computing hardware that executes one or more software products for processing data supplied in operation from the mobile communication device 102. The server system 104 can be arranged as cloud service or as dedicated servers located in single or distributed sites. Further, examples of the communication network 106 include, but are not limited to, telecommunication network, and WiFi.

The mobile communication device 102 includes one or more sensors 108 and one or more positioning systems 110 to determine the position, movement, acceleration and/or environment of the mobile communication device 102, when corresponding user performs one or activities while carrying the device 102. Examples of activities, include, but are not limited to, walking, running, jogging, cycling, rowing, driving a car, moving with train, moving with bus, walking stairs, running stairs, jumping, swimming, playing football, and skiing. An example of the sensor 108 includes a motion sensor configured to measure the acceleration of the mobile communication device 102 in xyz-directions of the Cartesian co-ordinate system. Further examples of the sensor 108 include a gyroscopic angular sensor, a magnetometer, a microphone, a camera, and a temperature sensor. The positioning systems 110 are configured to determine the position of the mobile communication device 102 by implementing at least one of GPS positioning system, cell tower information for cellular networks, indoor positioning systems, WIFI fingerprinting and proximal WiFi networks. In an embodiment of the present invention, the mobile communication device 102 may periodically send the information collected by the sensors 108 and the positioning systems 110 to the server system 104 over the communication network 106.

The server system 104 includes a receiving module 112, a first processing module 114, a second processing module 116, and an output module 118. The receiving module 112 receives sensor and positioning data from the mobile communication device 102. The first processing module 114 executes a first process to analyze sensor data collected from the sensors 108, and the second processing module 116 executes a second process to analyze positioning data collected from the positioning systems 110. In an embodiment of the present disclosure, the first and second processes are parallel processes that might communicate with each other and also exchange data for analysis purposes. Based on the sensor data, the first processing module 114 generates an activity type of the user, and based on the positioning data, the second processing module 116 generates location and movement information pertaining to the activity. The output module 118 processes the activity type information and movement/location information of the activity to generate a summary/schedule of activities of the user. The output module 118 then sends the summary of activities to the mobile communication device 102 over the communication network 106.

The mobile communication device 102 includes a data processor (not shown) for executing a mobile software application thereat, wherein the mobile software application is operable to cause a graphical user interface (GUI) of the mobile communication device to present summary of activities provided from the server system 104 in a timeline format. The user may send their positive/negative feedback on the summary of activities to the server system 104 and the server system 104 may receive, store and implement the feedback for improving their activity analysis.

In an embodiment of the present invention, some or all of the steps/analysis in the server system 104 may be implemented in the mobile communication device 102 based on the computing resources available in the mobile communication device 102.

FIG. 1 is merely an example, which should not unduly limit the scope of the claims herein. One of ordinary skill in the art would recognize many variations, alternatives, and modifications of embodiments herein.

Figure 2:
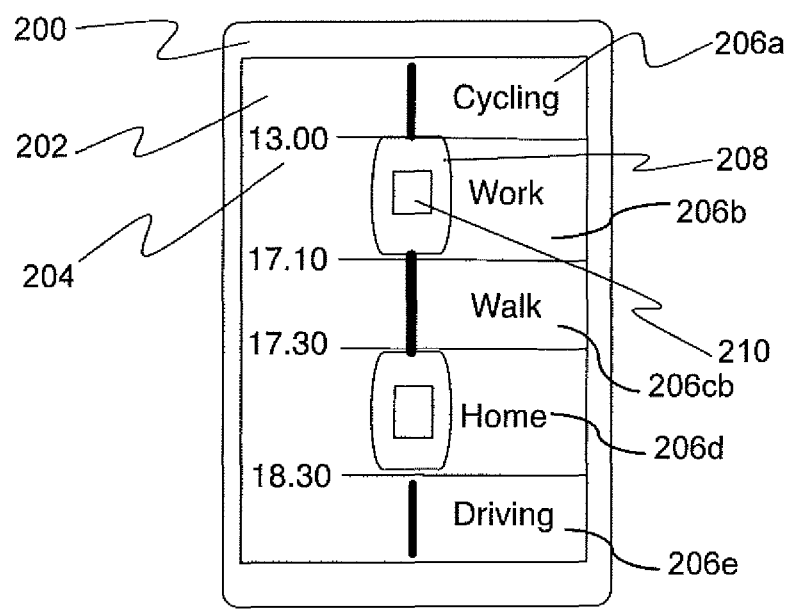
FIG. 2 is an illustration of a graphical user interface (GUI) of the mobile communication device, in accordance with the present disclosure.

FIG. 2 is an illustration of a graphical user interface (GUI) 202 of a mobile communication device 200, which is an example of the mobile communication device 102, and has been explained in conjunction with FIG. 1. The GUI 202 displays a time-line 204 that is divided into 'activity' zones/periods 206a, 206b, 206c, 206d and 206e, hereinafter collectively referred to as activity zones 206, based on start and end times of one or more activities. Each activity zone 206 illustrates an activity and corresponding location of the activity. Moreover, each activity zone 206 may be illustrated by a graphical symbol 208 or a text description 210 of the corresponding activity.

In an exemplary embodiment, the timeline 204 indicates that at a time 13:00 pm, a 'cycling' activity of the user ends and he/she is stationed at a 'workplace' until a time 17:10 pm; at the time 17:10 pm, the user starts a 'walking' activity towards home; at a time 17:30 pm, the user reaches home and is at home until a time 18:30 pm; at the time 18:30 pm, the user starts a 'driving' activity.

FIG. 2 is merely an example, which should not unduly limit the scope of the claims herein. One of ordinary skill in the art would recognize many variations, alternatives, and modifications of embodiments herein.

Figure 3:
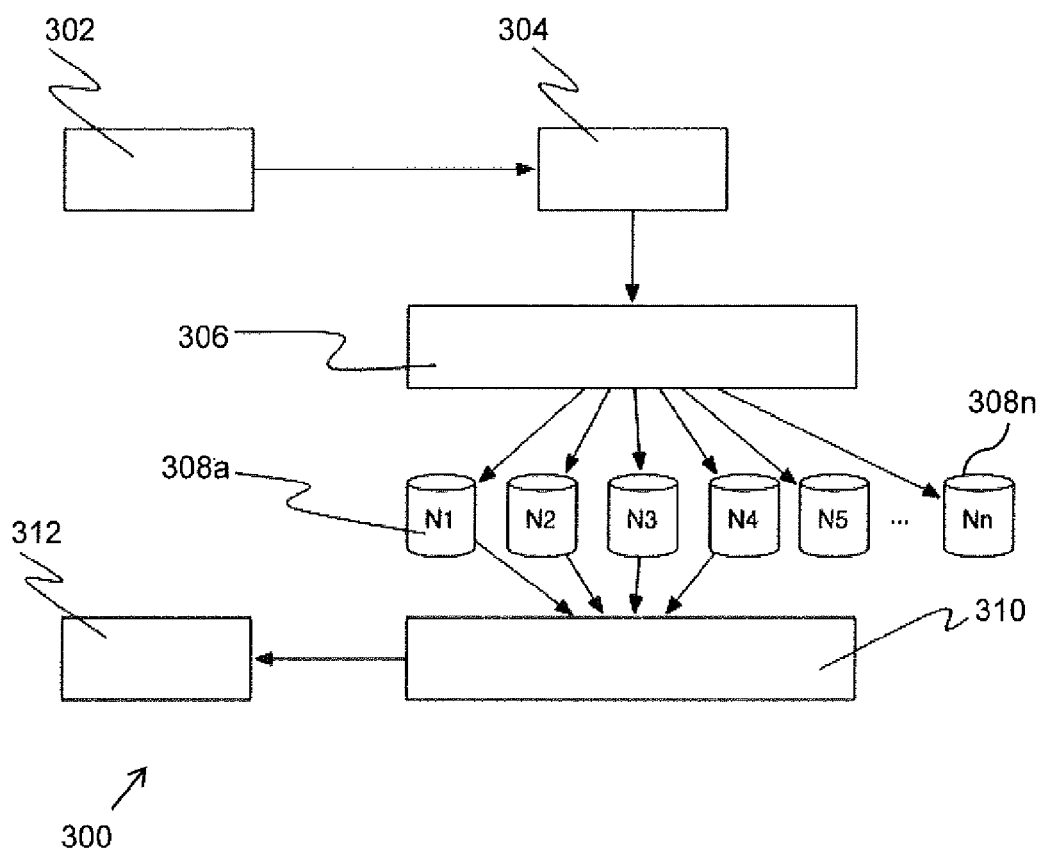
FIG. 3 is an illustration of an activity analysis system, in accordance with the present disclosure.

FIG. 3 is an illustration of an activity analysis system 300, explained in conjunction with FIG. 1, in accordance with the present disclosure. The activity analysis system 300 identify user activities based on sensor and positioning data of corresponding mobile communication device, and history, profile, demographics, and activity type of user.

In an embodiment of the present invention, the activity analysis system 300 may be present inside a remote server system 104. In another embodiment of the present invention, the activity analysis system 300 may be present, at least in part, inside the mobile communication device 102 itself.

The activity analysis system 300 includes a receiving module 302, a pre-processing module 304, a pre-classification module 306, a first through nth classifier nodes 308a till 308n, hereinafter referred to as classifier nodes 308, an activity determination module 310, and an output module 312. The receiving module 302 collects raw data, i.e. unprocessed data from the sensors 108 and positioning systems 110 of the mobile communication device 102. The pre-processing module 304 pre-processes the raw data collected by the receiving module 302. Examples of pre-processing the data include, but are not limited to, filtering the data, performing domain transitions such as time to frequency domain conversion using Fast Fourier Transformation (FFT), classifying the data, averaging the data and combining the data, performing correlations with one or more pre-determined data sets representative of various types of user activities.

The pre-classification module 306 receives the pre-processed data from the pre-processing module 304 and pre-classifies it into one or more broad categories. For example, the sensor data received from a motion sensor of the mobile communication device 102 is compared with a predetermined speed value to differentiate between slow motion, i.e. walking and running stairs, and fast motion i.e. running and cycling, and classify the motion data into broad categories such as 'slow motion' and 'fast motion'. In an embodiment, the pre-classification module 306 includes rule sets and/or predefined deterministic algorithms for pre-classifying the pre-processed data.

Each classifier node 308 includes a processor that is dedicated to identifying characteristics of the sensor data corresponding to a predefined activity. For example, the first classifier node N1 308a may be specialized in identifying characteristics of the sensor data pertaining to 'cycling' activity, the second classifier node N2 308b may be specialized in identifying 'walking activity', the third classifier node N3 308c may be specialized in identifying 'running' activity, and so on.

The classifier nodes 308 are configured to process the pre-classified data substantially in parallel, where each classifier node 308 generates a likelihood of the corresponding predefined activity for the pre-classified data. In an exemplary embodiment, the first classifier node N1 308a dedicated to identification of 'cycling' activity may generate a probability value '1', the second classifier node N2 308b may generate a probability value '0.3' and the third classifier node N3 308c may generate a probability value '0.8', when the user performs a 'cycling' activity.

The activity determination module 310 may aggregate the probability values generated by the classifier nodes 308 to determine an 'activity type' corresponding to the sensor and positioning data collected by the receiving module 302. In addition to aggregating the probabilities of the classifier nodes 308, the activity determination module 310 may employ deterministic rules such as transition windows to determine the 'activity type'. The transition window may set inertia to activities in order not to toggle activities too often. For example, it is unlikely that an activity type would change from 'cycling' to 'walking' and back to 'cycling' very fast. The deterministic rules such as transition windows may be implemented using models such as hidden Markov models (HMM) and more complex models based on HMMs.

The output module 312 provides one or more 'activity types' determined by the activity determination module 310 to the mobile communication device 102. In an embodiment, the output module 312 may display the determined activity types on a graphical user interface (GUI) of the mobile communication device 102 in a timeline format.

FIG. 3 is merely an example, which should not unduly limit the scope of the claims herein. One of ordinary skill in the art would recognize many variations, alternatives, and modifications of embodiments herein.

Figure 4:
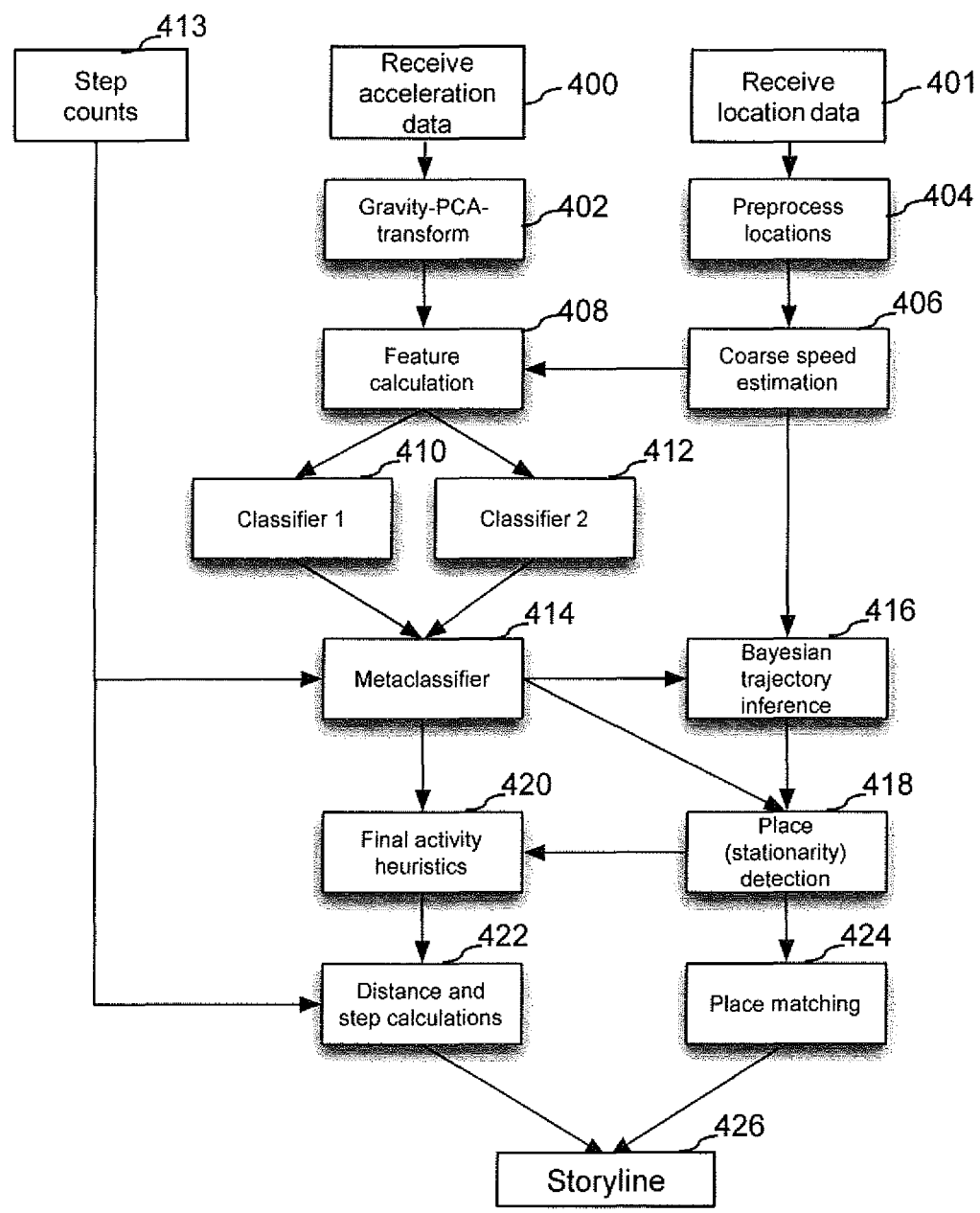
FIG. 4 is an illustration of steps of a method for identifying a 'cycling' activity of a user, in accordance with an embodiment of the present disclosure.

FIG. 4 is an illustration of steps of a method for identifying a 'cycling' activity of a user based on the sensor and positioning data of the corresponding mobile communication device, in accordance with an embodiment of the present disclosure.

In an embodiment of the present invention, the steps of the method for identifying the 'cycling' activity of a user may be executed by the activity analysis system 300 of FIG. 3. The activity analysis system 300 may be present inside a remote server system 104 or may be present, at least in part, inside the mobile communication device 102 of user itself.

At a step 400, a set of acceleration data is received from an accelerometer sensor of the mobile communication device 102. The set of acceleration data is in raw format, i.e. unprocessed, and may be collected every 30 seconds by the accelerometer sensor. In an exemplary embodiment, the set of acceleration data has a duration of 3 seconds and includes acceleration samples collected every 1120 seconds. Thus, each 3 second data set includes total 60 acceleration samples and each acceleration sample includes acceleration of the mobile communication device 102 in x, y, and z directions, in a coordinate system oriented with the mobile communication device 102. Thus, each acceleration sample includes three values and the three second data set includes total 180 (3×60) values.

At a step 401, a set of location data is received from a positioning system of the mobile communication device 102. The positioning data may include timestamps, location coordinates, and estimated horizontal accuracy from mobile location services. In an exemplary embodiment, the location data is received at intervals ranging from few seconds to few minutes.

At a step 402, the set of acceleration data undergoes gravity transformation, in which, for each acceleration sample, a new transformed sample is calculated, where corresponding z-component is oriented along a mean value of the acceleration vector. In another embodiment, the set of acceleration data may undergo a principal component analysis (PCA) transformation, in which, for each acceleration sample, a new transformed sample is calculated, where corresponding z-coordinate remains same, but the corresponding x and y components are transformed so that they are oriented along the principal components of the acceleration sample, when only x and y components are included.

At a step 404, the location data may be pre-processed, where examples of pre-processing the data includes, but are not limited to, filtering the data, performing domain transitions such as time to frequency domain conversion using Fast Fourier Transformation (FFT), classifying the data, averaging the data, performing one or more correlations on the data, and combining the data. At a step 406, a coarse speed of the mobile communication device 102 may be estimated based on the pre-processed location data. For example, the coarse speed may be estimated based on distance between consecutive location co-ordinates and time difference between the consecutive location co-ordinates.

At a step 408, one or more features of sensor and location data are estimated based on the transformed acceleration samples and the estimated course speed, where each 'feature' has a numeric value. Examples of features include means, variances, minimums and maximums for each of the (x, y, z) components of the transformed acceleration samples, components of Fourier transformed versions of the x, y, or z components of the acceleration sample, and so forth.

The user activity corresponding to data obtained at the step 408 may be recognized based on a first classification at a step 410 using a first classifier and a second classification at a step 412 using a second classifier. In an embodiment, the first and second classifiers may be similar to classifier nodes 308 of FIG. 3. Although two classifiers are illustrated herein, it would be apparent to a person skilled in the art, that more than two classifiers can be used for recognizing the user activity.

The first and second classifiers at the steps 410 and 412 use standard supervised classification algorithms such as neural network, decision forest or support vector machine for classification. The first classifier is a binary classifier that is trained on a large training data set with training samples classified as 'cycling' or 'non-cycling', and generates an activity label 'cycling' or 'non-cycling' for the data sample obtained at the step 408. The second classifier is a multiclass classifier that is trained on a smaller set of more accurately labeled data, and generates an activity label from one of 'cycling', 'running', 'car', 'train', 'walking' and 'other' for the data sample obtained at the step 408.

In an embodiment, the user activity is recognized as 'cycling' if both the first and second classifiers generate activity label as 'cycling' for the data sample obtained at the step 408. In another embodiment, the user activity is recognized based on the activity label generated by the second classifier when the first classifier generates an activity label as 'not cycling'. In yet another embodiment, the user activity is recognized as 'other', when the first classifier generates an activity label as 'not cycling' and the second classifier generates an activity label as 'cycling'. In yet another embodiment, the first classifier may generate a probability that the user activity is 'not cycling'. When the probability of 'not cycling' is high, then other classifier results indicating 'cycling' as activity might be omitted.

At a step 413, the step counts of the user are calculated, and at a step 414, a meta-classifier utilizes the step count data and the data generated by the first and second classifiers to combine activities recognized at the steps 410 and 412 to form one or more activity periods. In an embodiment, when there are N consecutive acceleration samples, such that 1st and last of them are labeled with a given activity, and the majority (or at least x % of them) belong to that activity, the whole period of N consecutive samples is identified as an activity period.

At a step 416, one or more activity periods may be associated with respective locations based on location data and Bayesian 'interactive multiple models' smoothing algorithm. At a step 418, one or more stationary segments may be recognized based on the location data, when the mobile communication device 102 is stationary and no activity is performed therein.

At a step 420, final activity heuristics-type analysis takes place based on the processed location and acceleration data. The heuristics are rules, and an example of a rule is: if a stationary segment recognized at the step 418 has a period of no recognized activity shorter than x seconds, and the neighboring activity periods have a duration greater than y seconds, the stationary segment is replaced with an activity period labeling it with the neighboring activity/activities. For example, if in a 10 minutes cycling activity, the user appears to have stopped for 1 minute in between, then the 1 minute stationary segment is ignored, and the whole 10 minutes are associated with cycling activity. Moreover, if in a 10 minutes period, there are consecutive cycling and transport activities, and there is no stopping of at least n minutes in between and no walking activity, then the whole 10 minutes period is labeled with the activity that has happened for majority of the time. However, if there is at least one detected walking sample between transport and cycling activities, then the cycling and transport activities form two different activity periods.

At a step 422, distance and step calculations are performed, and at a step 424 place matching is performed to optimize the accuracy of user activities recognized at the step 420. Finally, at a step 426, a storyline is created which includes various user activities in a timeline format.

FIG. 4 is merely an example, which should not unduly limit the scope of the claims herein. One of ordinary skill in the art would recognize many variations, alternatives, and modifications of embodiments herein.

Figure 5:
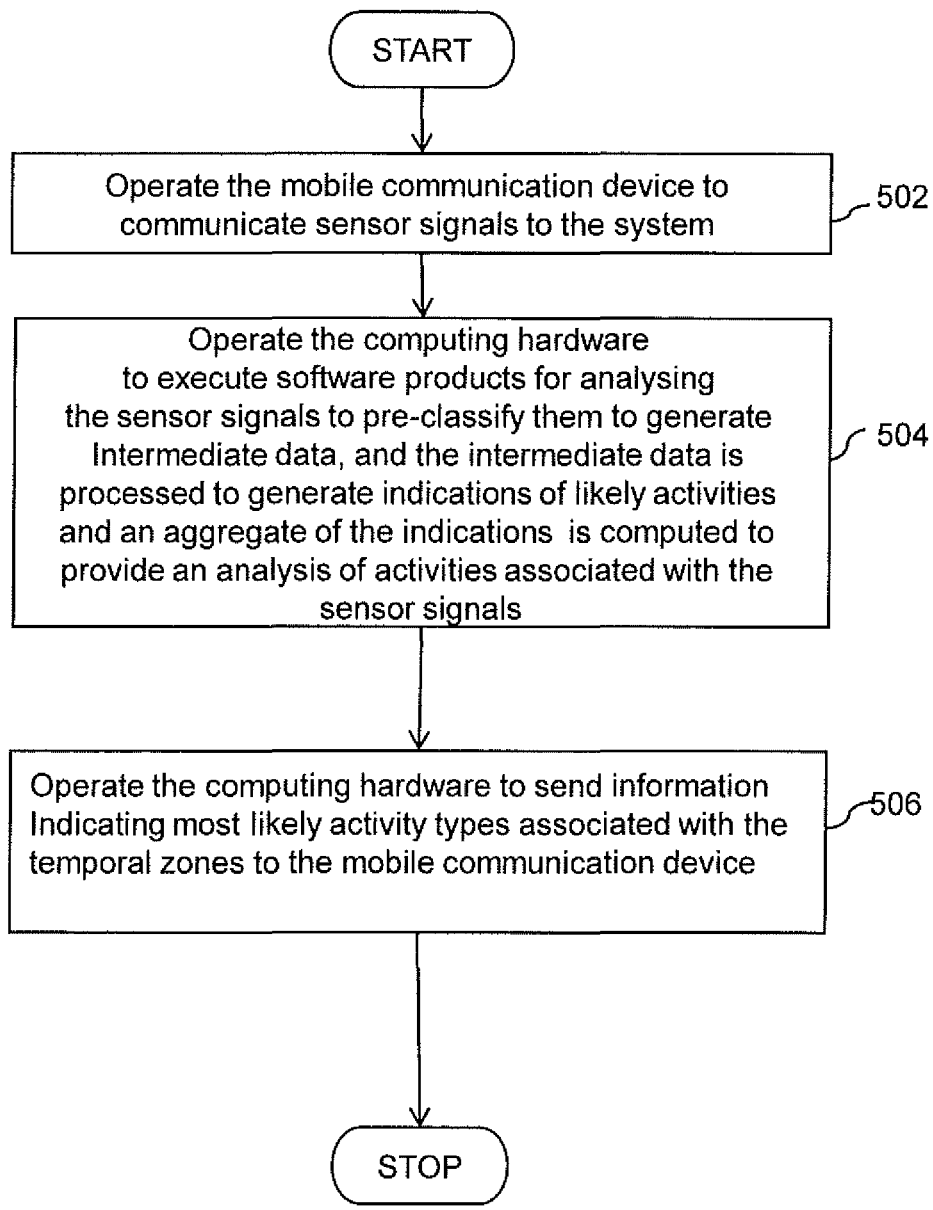
FIG. 5 is an illustration of steps of using a system for tracking and recording movements of the mobile communication device, in accordance with the present disclosure.

FIG. 5 is an illustration of steps of using the system 100 for tracking and recording movements of the mobile communication device 102, in accordance with the present disclosure, and has been explained in conjunction with FIGS. 1 and 2. The method is depicted as a collection of steps in a logical flow diagram, which represents a sequence of steps that can be implemented in hardware, software, or a combination thereof.

At a step 502, the mobile communication device 102 is operable to communicate one or more sensor signals, or sensor data corresponding thereto, to the server system 104, wherein the sensor signals are indicative of motion associated with activities to which the mobile communication device 102 is exposed by its user. The sensor signals, or the corresponding sensor data, are outputs of one or more sensors of the mobile communication device 102.

At a step 504, the computing hardware of the server system 104 is operable to execute one or more software products for analysing the sensor signals and corresponding sensor data, wherein the computing hardware is operable to pre-classify the sensor signals to generate intermediate data, and the intermediate data is thereafter processed in one or more processors to generate one or more indications of likely activities associated with the sensor signals. The computing hardware is further operable to compute an aggregate of the one or more indications to provide an analysis of activities associated with the sensor signals.

At a step 506, the computing hardware is operable to send information indicating most likely activity types associated with the one or more temporal zones to the mobile communication device 102.

It should be noted here that the steps 502 to 506 are only illustrative and other alternatives can also be provided where one or more steps are added, one or more steps are removed, or one or more steps are provided in a different sequence without departing from the scope of the claims herein.

Although embodiments of the present invention have been described comprehensively in the foregoing, in considerable detail to elucidate the possible aspects, those skilled in the art would recognize that other versions of the invention are also possible. Embodiments of the present invention are susceptible to being employed for monitoring prisoners in prisons, for monitoring patients in home for elderly people, in hospitals and such like.

What is claimed is:
1. A method comprising:
by one or more computing devices, receiving from a mobile device one or more sensor signals indicative of motion associated with activities of a user of the mobile device;
by one or more computing devices, determining a plurality of activity types that correspond to a portion of the sensor signals;
by one or more computing devices, determining one or more activity periods of the user, wherein each activity period comprises a period of time corresponding to one or more activity types, by:
analyzing the sensor signals against each of the activity types; and
calculating a probability of each of the activity types of the user based on the analysis;
by one or more computing devices, determining whether two or more of the activity periods should be combined into a single activity period, wherein the determining is based on a heuristics-type analysis based on a length of time for each of the two or more activity periods and activity types corresponding to each of the two or more activity periods; and by one or more computing devices, sending the activity periods to the mobile device.

2. The method of claim 1, wherein the sensor signals are analyzed substantially in parallel by one or more processors of the computing devices, the processors being mutually specialized in identifying characteristics of the sensor signals corresponding to one or more activity types.

3. The method of claim 1, wherein determining the activity periods comprises generating a temporal log of activity types experienced by the mobile device.

4. The method of claim 1, wherein the mobile device comprises a personal computer, a portable media device, a smartphone, a wrist-worn phone, a phablet, a mobile telephone, or a tablet computer.

5. The method of claim 1, wherein the mobile device comprises one or more sensors comprising a gyroscopic angular sensor, an accelerometer, a GPS position sensor, a cellular positioning sensor, a magnetometer, a microphone, a camera, or a temperature sensor.

6. The method of claim 1, wherein the analysis of the sensor signals comprises:
a supervised or semisupervised classification analysis; or
a heuristic analysis.

7. The method of claim 6, wherein the supervised or semisupervised classification analysis comprises classification algorithms that use as input the amplitudes of the frequency components of the information included in the sensor signals, and the output of the classification algorithms are estimated probabilities of different activity types based on the sensor signals.

8. The method of claim 1, wherein sending the activity periods comprises sending analyzed activity results to the mobile device for display on a graphical user interface of a software application of the mobile device, wherein the activity periods comprise a timeline comprising a plurality of mutually different symbols representing different analyzed activity types.

9. A system comprising:
one or more processors; and
a memory coupled to the processors comprising instructions executable by the processors, the processors being operable when executing the instructions to:
receive from a mobile device one or more sensor signals indicative of motion associated with activities of a user of the mobile device;
determine a plurality of activity types that correspond to a portion of the sensor signals;
determine one or more activity periods of the user, wherein each activity period comprises a period of time corresponding to one or more activity types, by:
analyzing the sensor signals against each of the activity types; and calculating a probability of each of the activity types of the user based on the analysis;
determine whether two or more of the activity periods should be combined into a single activity period, wherein the determining is based on a heuristics-type analysis based on a length of time for each of the two or more activity periods and activity types corresponding to each of the two or more activity periods; and send the activity periods to the mobile device.

10. The system of claim 9, wherein the sensor signals are analyzed substantially in parallel by the processors, the processors being mutually specialized in identifying characteristics of the sensor signals corresponding to one or more activity types.

11. The system of claim 9, wherein determining the activity periods comprises generating a temporal log of activity types experienced by the mobile device.

12. The system of claim 9, wherein the mobile device comprises a personal computer, a portable media device, a smartphone, a wrist-worn phone, a phablet, a mobile telephone, or a tablet computer.

13. The system of claim 9, wherein the mobile device comprises one or more sensors comprising a gyroscopic angular sensor, an accelerometer, a GPS position sensor, a cellular positioning sensor, a magnetometer, a microphone, a camera, or a temperature sensor.

14. The system of claim 9, wherein the analysis of the sensor signals comprises:
a supervised or semisupervised classification analysis; or
a heuristic analysis.

15. The system of claim 14, wherein the supervised or semisupervised classification analysis comprises classification algorithms that use as input the amplitudes of the frequency components of the information included in the sensor signals, and the output of the classification algorithms are estimated probabilities of different activity types based on the sensor signals.

16. The system of claim 9, wherein sending the activity periods comprises sending analyzed activity results to the mobile device for display on a graphical user interface of a software application of the mobile device, wherein the activity periods comprise a timeline comprising a plurality of mutually different symbols representing different analyzed activity types.

17. One or more computer-readable non-transitory storage media embodying software that is operable when executed to:
receive from a mobile device one or more sensor signals indicative of motion associated with activities of a user of the mobile device;
determine a plurality of activity types that correspond to a portion of the sensor signals;
determine one or more activity periods of the user, wherein each activity period comprises a period of time corresponding to one or more activity types, by:
analyzing the sensor signals against each of the activity types; and calculating a probability of each of the activity types of the user based on the analysis;
determine whether two or more of the activity periods should be combined into a single activity period, wherein the determining is based on a heuristics-type analysis based on a length of time for each of the two or more activity periods and activity types corresponding to each of the two or more activity periods; and
send the activity periods to the mobile device.

18. The media of claim 17, wherein the sensor signals are analyzed substantially in parallel by one or more processors executing the software, the processors being mutually specialized in identifying characteristics of the sensor signals corresponding to one or more activity types.

19. The media of claim 17, wherein the analysis of the sensor signals comprises:
a supervised or semisupervised classification analysis; or
a heuristic analysis.

20. The media of claim 19, wherein the supervised or semisupervised classification analysis comprises classification algorithms that use as input the amplitudes of the frequency components of the information included in the sensor signals, and the output of the classification algorithms are estimated probabilities of different activity types based on the sensor signals.

* * * * *